United States Patent Office 3,318,920
Patented May 9, 1967

3,318,920
TETRACYCLIC AND PENTACYCLIC TRITERPENE-GUANYLHYDRAZONES AND THEIR PRODUCTION
Karlheinz Meyer, Hans Krätzer, and Siegismund Schütz, Wuppertal-Elberfeld, Hans-Günther Kroneberg, Haan, Rhineland, and Kurt Stoepel, Wuppertal-Vohwinkel, Germany, assignors to Farbenfabriken Bayer Aktiengesellschaft, Leverkusen, Germany, a German corporation
No Drawing. Filed Feb. 10, 1965, Ser. No. 431,711
Claims priority, application Germany, Feb. 12, 1964, F 41,986
8 Claims. (Cl. 260—397.2)

The present invention relates to new cardiotonic compounds and their production and more particularly, to guanylhydrazones of tetracyclic and pentacyclic triterpenes and their therapeutically acceptable non-toxic salts.

It has now been found that valuable new therapeutic compounds are obtained when tetracyclic and pentacyclic triterpenes containing one or more keto or aldehyde groups are converted to the corresponding guanylhydrazones which can still contain one or more free keto or aldehyde carbonyl groups.

According to the invention, the novel compounds are prepared by allowing tetracyclic or pentacyclic triterpenes containing one or more keto or aldehyde groups:
(a) to react with aminoguanidine or its salts in a manner known per se; or
(b) to condense with thiosemicarbazide and either to react the condensation products with ammonia or first to convert them in known manner to the S-alkyl-isothio-semicarbazones and then to react these with ammonia; or
(c) to react with S-alkyl-isothio-semicarbazide or its salts and to react ammonia with these products; or
(d) to condense with hydrazine and subsequently to react with cyanamide.

The substances prepared according to the invention have cardiac, i.e. cardiotonic, activity by themselves or in the form of their salts with pharmaceutically acceptable non-toxic organic and inorganic acids. Suitable acids are, for instance, acetic acid, propionic acid, lactic acid, maleic acid, fumaric acid, succinic acid, tartaric acid, citric acid, salicylic acid, naphthalene-1,5-disulphonic acid, phosphoric acid, hydrochloric acid, etc.

Suitable starting materials for the invention are, for instance, olean-12-ene-2-one;
olean-13(18)-ene-2-one;
olea-10,12-diene-2-one;
oleanan-2-one;
olean-10-ene-2-ol-12-one;
oleanan-2-ol-12-one;
olean-12-ene-2,11-dione;
olea-10,13(18)-diene-2-ol-12,19-dione;
olean-12-ene-2-ol-16-one;
olean-12-ene-2,16-dione;
olea-10,13(18)-diene-2-ol-12,19-dione-28-carboxylic acid;
oleanonic acid;
28-nor-olean-17-ene-2-one;
28-nor-olea-10,17-diene-2,12,19-trione;
olean-12-ene-2-ol-7-one-28-carboxylic acid;
olean-12-ene-2,7-dione-28-carboxylic acid;
olean-12-ene-16-ol-2-one-carboxylic acid;
olean-12-ene-2,16-dione-28-carboxylic acid;
olean-12-ene-2-ol-11,15,16-trione-28-carboxylic acid;
28-nor-olean-12-ene-2-one;
28-nor-olean-12-ene-2,16-dione;
olean-12-ene-2,19-dione-28-carboxylic acid;
23-nor-olean-12-ene-2,16-dione-28-carboxylic acid;
olean-12-ene-2,11-dione-30-carboxylic acid;
olea-10,13(18)-diene-2-ol-12,19-dione-30-carboxylic acid;
30-nor-olea-10,13(18)-diene-2-ol-12,19-dione;
23-nor-olean-12-ene-2,16-dione;
2-keto-$\Delta^{12,13}$-ursene;
27-nor-2-hydroxy-28-oxo-$\Delta^{12,13}$;
14,15-ursadiene;
2-keto-lupane;
2-keto-$\Delta^{20,29}$-lupene;
29-nor-20-keto-lupane;
29-nor-2,20-diketo-lupane;
2-hydroxy-28-oxo-$\Delta^{20,29}$-lupene;
28-hydroxy-2-keto-$\Delta^{20,29}$-lupene;
2,28-dioxo-$\Delta^{20,29}$-lupene;
2,28-dioxo-lupane;
2-keto-$\Delta^{20,29}$-28-lupenic acid;
$\Delta^{8,24}$-lanostadiene-3-one;
$\Delta^{7,9(11,24)}$-lanostatriene-3-one;
$\Delta^{8}$-lanosten-3-one;
lanostan-3-one;
3-hydroxy-$\Delta^{9(11)}$-lanosten-7-one;
3-hydroxy-lanostan-7-one;
$\Delta^{8}$-lanostene-3,7-dione;
lanostane-3,11-dione;
lanostene-7,11-dione;
$\Delta^{8}$-lanostene-3,7,11-trione and the corresponding esters.

The above mentioned compounds only represent some of the possible examples of substances suitable as starting materials. In addition, tetracyclic and pentacyclic triterpenes which contain one or more keto or aldehyde groups in any desired position on the ring and/or in attached side chains are quite generally suitable as starting materials for the invention. The tetracyclic and pentacyclic triterpenes employed as the starting materials may be saturated compounds or they may be compounds which are unsaturated once or several times. In addition, the triterpene skeleton may be arbitrarily substituted by suitable radicals such as, for instance, OH, O-alkyl, O-acyl, epoxy, halogen, alkyl, alkenyl, acyl, COOR, etc., wherein R is an alkyl radical containing 1 to 4 carbon atoms.

The invention is illustrated by the following non-limitative examples.

EXAMPLE I 340 g. of aminoguanidine hydrogen carbonate are dissolved in a methanol solution of hydrochloric acid until the pH value is 2 and then treated with a solution of 500 mg. of 2,28-dioxo-$\Delta^{20,29}$-lupene in 50 ml. of methanol. This is left to stand at room temperature under nitrogen for 3 days, stirred into ether and decanted, and the viscous precipitate is dissolved in ethanol and stirred once more into ether. The flakes which separate are filtered off with suction and reprecipitated from ethanol/ether, giving 0.4 g. of the dihydrochloride of $\Delta^{20,29}$-lupene-2,28-bis-guanylhydrazone of M.P. 266–268° C. (decomp.).

EXAMPLE II 400 mg. of 2,11-diketo-$\Delta^{12,13}$-30-olealenic acid are dissolved in 50 ml. of ethanol, treated with a solution of 170 mg. of aminoguanidine hydrogen carbonate in a methanol solution of hydrochloric acid (at a pH value of 2) and left to stand at room temperature under nitrogen for 3 days. This is stirred into ether, the separated flakes filtered off with suction and reprecipitated from ethanol/ether, giving 0.3 g. of 11-keto-$\Delta^{12,13}$-30-oleanenic acid-2-guanylhydrazone hydrochloride of M.P. 340° C.

$\Delta^{12,13}$-oleanene-2-guanylhydrazone hydrochloride of M.P. 328–330° C. (decomp.) is prepared in analogous manner.

EXAMPLE III 270 mg. of $\Delta^{8,24}$-lanostadiene-3-one are dissolved in about 10 ml. of methanol and treated with a solution of 100 ml. of aminoguanidine hydrogen carbonate in a methanol solution of hydrochloric acid. After it has been left to stand at room temperature for 48 hours, this solution is stirred into ether. A colorless solid substance is only precipitated when this ether solution is evaporated. The precipitate is boiled out twice with acetone, giving 250 mg. of the hydrochloride of $\Delta^{8,24}$-lanostadiene-3-guanylhydrazone of M.P. 246–248° C.

EXAMPLE IV 300 mg. of 20-keto-lupane-2,28-diol are dissolved in 15 ml. of ethanol and treated with a solution of 115 mg. of aminoguanidine hydrogen carbonate in a methanol solution of hydrochloric acid. After it has been left to stand at room temperature for 20 hours, this solution is stirred into ether. The colorless solid substance is purified by repeatedly dissolving it in absolute methanol and stirring into ether, giving 280 mg. of the hydrochloride of 2,28-dihydroxy-lupane-20-guanylhydrazone of M.P. 306–312° C. (decomp.).

What is claimed is:
1. A compound selected from the group consisting of a mono- or bis-guanyl hydrazone of the lanostane, lupane and oleanane series and a pharmaceutically acceptable non-toxic salt thereof.
2. A compound according to claim 1, in which there is a free keto group in position 11.
3. A compound according to claim 1, in which the lanostane, lupane or oleanane is unsaturated.
4. $\Delta^{20,29}$-lupene-2,28-bis-guanyl hydrazone.
5. 11-keto-$\Delta^{12,13}$-30-oleanenic acid-2-guanyl hydrazone.
6. $\Delta^{12,13}$-oleanene-2-guanyl hydrazone.
7. $\Delta^{8,24}$-lanostadiene-3-guanyl hydrazone.
8. 2,28-dihydroxy-lupane-20-guanyl hydrazone.

References Cited by the Examiner

UNITED STATES PATENTS 2,319,012  5/1943  Miescher et al. _____ 260—397.3

OTHER REFERENCES

Loewenthal, Tetrahedron, vol. 6, No. 4, pp. 269–303, June 1959, p. 294 relied on.

LEWIS GOTTS, *Primary Examiner.*

HENRY A. FRENCH, *Assistant Examiner.*